(12) United States Patent
Gansen

(10) Patent No.: US 7,787,921 B2
(45) Date of Patent: Aug. 31, 2010

(54) LINK COUPLED ANTENNA SYSTEM ON A FIELD DEVICE HAVING A GROUNDED HOUSING

(75) Inventor: Carl R. Gansen, Belle Plaine, MN (US)

(73) Assignee: Rosemount Inc., Eden Prairie, MN (US)

( * ) Notice: Subject to any disclaimer, the term of this patent is extended or adjusted under 35 U.S.C. 154(b) by 620 days.

(21) Appl. No.: 11/811,765

(22) Filed: Jun. 12, 2007

(65) Prior Publication Data

US 2008/0309575 A1 Dec. 18, 2008

(51) Int. Cl.
*H04M 1/00* (2006.01)
*H04B 1/10* (2006.01)
*H01Q 1/52* (2006.01)

(52) U.S. Cl. ............... 455/575.5; 455/300; 455/301; 343/841; 343/851

(58) Field of Classification Search .......... 455/300, 455/301, 575.5, 575.8, 90.3
See application file for complete search history.

(56) References Cited

U.S. PATENT DOCUMENTS

| 5,457,447 | A | * | 10/1995 | Ghaem et al. ............. 340/10.42 |
| 5,625,370 | A | * | 4/1997 | D'Hont ..................... 343/788 |
| 5,854,970 | A | | 12/1998 | Kivela ........................ 455/90 |
| 6,882,263 | B2 | * | 4/2005 | Yang et al. ................ 336/200 |
| 7,132,939 | B2 | * | 11/2006 | Tyndall et al. ............. 340/447 |
| 2003/0043052 | A1 | * | 3/2003 | Tapperson et al. ...... 340/825.37 |
| 2004/0036621 | A1 | * | 2/2004 | Morita et al. .............. 340/682 |
| 2004/0150516 | A1 | * | 8/2004 | Faetanini .................... 340/444 |
| 2005/0269902 | A1 | * | 12/2005 | Thiesen ................ 310/313 R |
| 2006/0126581 | A1 | * | 6/2006 | Katsumata et al. ......... 370/338 |
| 2006/0128503 | A1 | * | 6/2006 | Savarese et al. ............ 473/353 |
| 2007/0152904 | A1 | * | 7/2007 | Castaneda et al. .......... 343/859 |
| 2007/0175322 | A1 | * | 8/2007 | Baum et al. ................. 84/737 |
| 2007/0213006 | A1 | * | 9/2007 | Wong et al. ............... 455/13.4 |

FOREIGN PATENT DOCUMENTS

EP 0854535 A2 7/1998

OTHER PUBLICATIONS

Notification of Transmittal of the International Search Report and the Written Opinion of the International Searching Authority, or the Declaration for PCT/US2008/007229, filed Jun. 10, 2008. 13 pages.

* cited by examiner

*Primary Examiner*—Duc M Nguyen
(74) *Attorney, Agent, or Firm*—Westman, Champlin & Kelly, P.A.

(57) ABSTRACT

A field device in an industrial process control system having an electrically grounded housing with an electrical circuit located within the housing is described. The electrical circuit includes wireless communication circuitry and is electrically isolated from the housing. The field device also includes an antenna that is attached to the housing and a cable having a shield positioned between the wireless communication circuitry and the antenna. The cable provides electrical communication between the electrical circuit and the antenna. The electrical circuit is electrically isolated from the housing, and the shield of the cable is electrically grounded to the housing.

19 Claims, 5 Drawing Sheets

LINK COUPLED ANTENNA SYSTEM ON A FIELD DEVICE HAVING A GROUNDED HOUSING

BACKGROUND

The present discussion relates to industrial process control monitoring systems. More particularly, the present discussion relates to field devices in process control systems that include wireless communication capability.

In industrial settings, control systems are used to monitor and control industrial and chemical processes and the like. Typically, the control systems perform these functions using field devices that are distributed at key locations in the industrial process and are coupled to the control circuitry in the control room by a process control loop. The term "field device" refers to any device that performs a function in a distributed control or process monitoring system, including devices used in the measurement, control, and monitoring of industrial processes.

Some field devices include a transducer. A transducer, for the purposes of this discussion, is understood to mean either a device that generates an output signal based on a physical input or that generates a physical output based on an input signal. Typically, a transducer transforms an input into an output having a different form. Some examples of transducers include pressure sensors, thermistors, thermocouples, strain gauges, flow transmitters, positioning devices, actuators, solenoids, and indicator lights.

Generally, field devices are characterized by their ability to operate in environments in which the field devices may be exposed to environmental stresses such as temperature, humidity and pressure. In addition, field devices must often withstand exposure to corrosive, hazardous and/or even explosive environments. Further, such devices may also be required operate in the presence of vibration and/or electromagnetic interference. For protection in such potentially harsh environments, field devices often include a rugged housing, often made of metal. Not only do field devices have to operate in potentially harsh environments, they often have to make sensitive measurements. Thus, the circuitry within particular field devices often requires sensitive components to make accurate measurements.

Field devices can also include circuitry for communicating over a process control loop with other monitoring or control devices such as, for example, other installed field devices, hand held tools, or equipment that may be remotely located, for example, in a process control room. Data transmitted over the process control loop can be transmitted in either an analog or digital format. Analog field devices are often connected to other devices via two-wire process control current loops. For example, a number of field devices can be connected to a process control room via a single two-wire control loop. In addition to, or alternatively, the process control loop can carry digital signals used for communication between devices. Field devices that communicate digitally can respond to and communicate selectively with selected devices. Further, such devices can provide additional signaling such as diagnostics and/or alarms.

Some field devices have incorporated wireless technologies to facilitate communication with other monitoring and control devices in addition to or instead of the two-wire communication loop described above. Wireless communication technologies provide the advantage of simplifying field device implementation because field devices that do not rely on wired communication need not have wires provided to them. Some field devices have an attached antenna that is in communication with wireless communication circuitry located with the field device to boost the transmitted signals.

SUMMARY

The present invention is directed toward wireless communication devices employing wireless communication circuitry that is electrically isolated from an antenna.

In one illustrative embodiment, a field device in an industrial process control system having wireless communication circuitry is discussed. The field device includes an electrically grounded housing and an electrical circuit located within the housing. The electrical circuit includes the wireless communication circuitry. The electrical circuit is electrically isolated from the housing of the field device. The field device also includes an antenna that is in communication with the wireless communication circuitry via an electrical conductor having a shield. The shield of the electrical conductor is grounded to the housing of the field device.

In another illustrative embodiment, another field device in an industrial process control system is disclosed. The field device includes an electrically grounded housing with an electrical circuit disposed within the housing. The electrical circuit is configured to produce a signal indicative of a sensed process parameter or variable. A wireless communication device is electrically coupled to the electrical circuit and an antenna is attached to the housing. The field device further includes a transformer having a first winding coupled to the wireless communication device and a second winding coupled to the antenna.

A method of communicating for a field device is discussed, which includes a step of providing a wireless communication device located within and electrically isolated from a housing. The wireless communication device is for sending and receiving information to and from remote devices. The method further includes attaching an antenna to the housing. In addition, the method includes positioning a transformer between the wireless communication device and the antenna. A signal is then transmitted between the wireless communication device and the antenna via the transformer.

DETAILED DESCRIPTION

Figure 1:
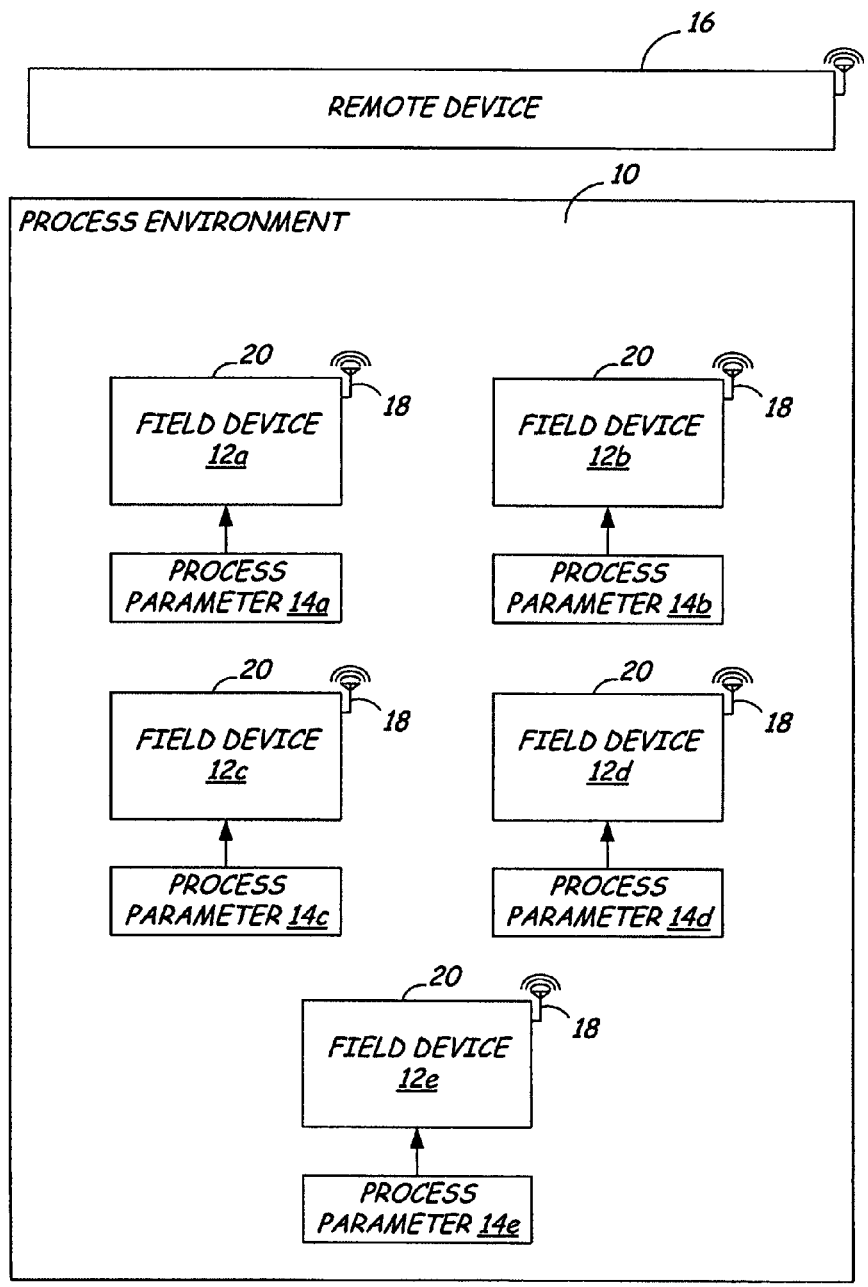
FIG. 1 is a block diagram of a process environment having a plurality of field devices in which a wireless power and communication unit in accordance with the present disclosure is particularly useful.

FIG. 1 is a block diagram illustration of a process environment 10 in which field devices 12a-e can be employed. Process environment 10 can be any industrial environment, including, for example, manufacturing, refining, or many other applications in which it is advantageous to monitor one or more process parameters or control a particular process. Each of the field devices 12a-e is exposed to the process and are capable of sensing a process variable or parameter 14a-e, respectively, related to the process and providing a signal indicative of a status of the particular process parameter 14a-e to which the particular field device is exposed. Examples of the types of process parameters or variables to which a particular field device may be exposed include temperature, pressure, fluid flow, pH levels, etc. Some field devices may be exposed to and be configured to measure a plurality of process parameters as well. Alternatively, or in addition, any of the field devices 12a-e may control one or more aspects of a particular process.

Each of the field devices 12a-e shown in FIG. 1 is capable of being in wireless communication with a remote device 16. To that end, each of the field devices 12a-e of FIG. 1 are shown as having an antenna 18 that is coupled to a housing 20. The remote device 16 can be, for example, a device located in a control room, a handheld device, or another field device. The remote device 16 can include any type of control or monitoring equipment that receives signals from any or all of the field devices 12a-e that it uses to monitor and/or control aspects of the process environment 10.

Figure 2:
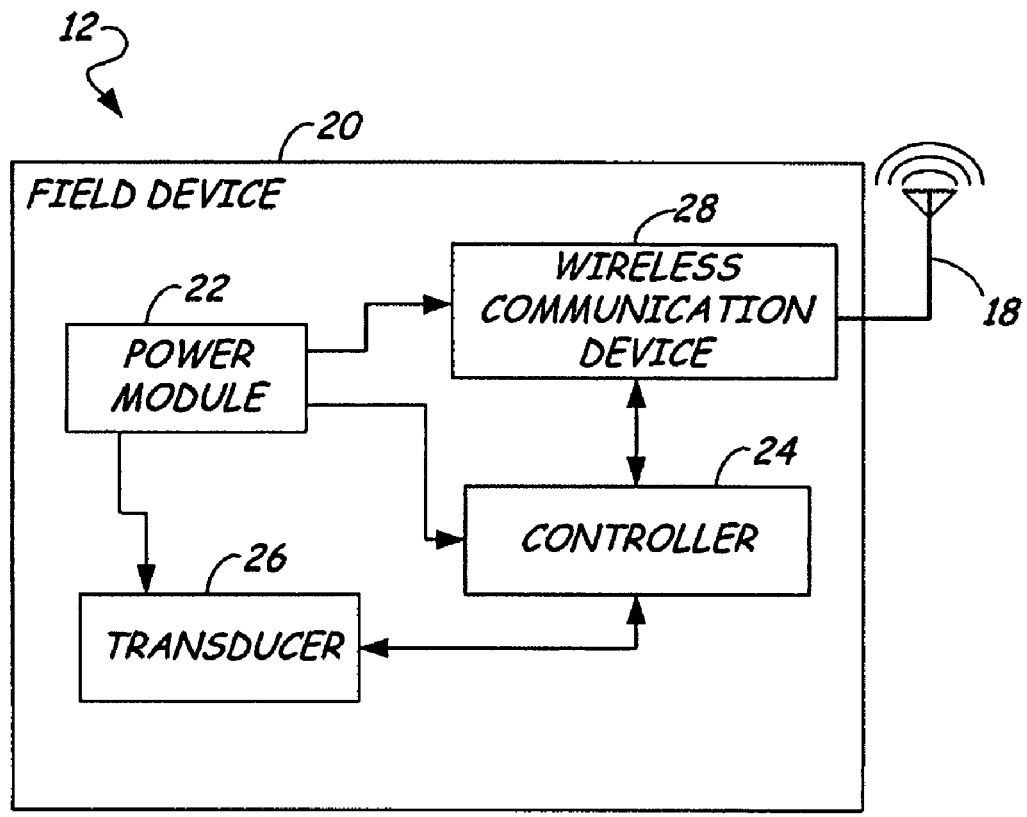
FIG. 2 is a block diagram detailing a field device of the type shown in FIG. 1.

FIG. 2 is a functional block diagram illustrating field device 12, which is representative of the field devices 12a-e shown in FIG. 1, in more detail according to one illustrative embodiment. Field device 12 includes a power module 22 for supplying power to the other components within the field device 12. Power module 22 can utilize any acceptable technology to provide appropriate electrical signal levels to various devices within the field device 12. For example, power module 22 can employ known thermopile devices to generate electricity from disparate temperatures using the Peltier Effect, including, but not limited to thermoelectric diodes; solid state thermogenerators; and semiconductor thermoelectric generators. Alternatively, power module 22 can include a solar cell. Other types of power modules can be used. For example, in lieu of an onboard power module 22, an external power supply (not shown) can provide a power signal to the field device 12.

Field device 12 also illustratively includes a controller 24, a transducer 26, and a wireless communication device 28 located within a housing 20. Power module 22 illustratively provides power to each of the controller 24, transducer 26 and wireless communication device 28. Transducer 26 is, in one embodiment, configured to measure a parameter to which it is exposed. Alternatively, transducer 26 can generate an output signal to control an external component (not shown). Controller 24 is in communication with the transducer 26 to send and/or receive signals to or from the transducer 26. Controller 24 also provides signals to the wireless communication device 28, which, in turn, is capable of communicating information with remote devices.

Wireless communication device 28 can communicate process-related information as well as device-related information to a remote device. Depending upon the application, wireless communication device 28 may be adapted to communicate in accordance with any suitable wireless communication protocol. Some examples of suitable wireless communication protocols include wireless networking technologies such as IEEE 802.11b or IEEE 802.19.4 wireless access points and wireless networking devices built by Linksys of Irvine, Calif. and cellular or digital networking technologies such as Microburst® by Aeris Communications Inc. of San Jose, Calif. Other examples include ultra wide band, free space optics, Global System for Mobile Communications (GSM), General Packet Radio Service (GPRS), Code Division Multiple Access (CDMA), spread spectrum technology, infrared communications techniques, SMS (Short Messaging Service/text messaging), or any other suitable wireless technology. Further, known data collision technology can be employed such that multiple units can coexist within wireless operating rage of one another. Such collision prevention can include using a number of different radio-frequency channels and/or spread spectrum techniques.

Wireless communication device 28 can also include transducers for a plurality of wireless communication methods. For example, primary wireless communication could be performed using relatively long distance communication methods, such as GSM or GPRS, while a secondary or additional communication method could be provided for technicians, or operators near the unit, using for example, IEEE 802.11b or Bluetooth.

Some wireless communications modules may include circuitry that can interact with the Global Positioning System (GPS). GPS can be advantageously employed in field device 12 for mobile devices to allow finding the individual field device 12 in a remote location. However, location sensing based upon other techniques can be used as well.

The field device 12 shown in FIG. 2 illustratively includes capability for wireless communication to the exclusion of wired communication. Alternatively, field device 12 can also include the capability to communicate via a wired communication protocol with other remote devices such as other field devices, displays, and other monitoring or control devices. For example, field device 12 can be equipped to communicate with devices over a two-wire process loop (not shown). Examples of process control loops that might be incorporated include analog 4-20 mA communication, hybrid protocols which include both analog and digital communication such as the Highway Addressable Remote Transducer (HART®) standard, as well as all-digital protocols such as the FOUNDATION™ Fieldbus standard. It may be advantageous in some instances to communicate with legacy devices that do not incorporate wireless technologies and thus such wired communication capabilities may be integrated within field device 12. In addition, such a wired communication protocol may, in some instances, provide a power supply to the field device 12, thereby providing power to some or all of the electrical components located within the field device 12.

Figure 3:
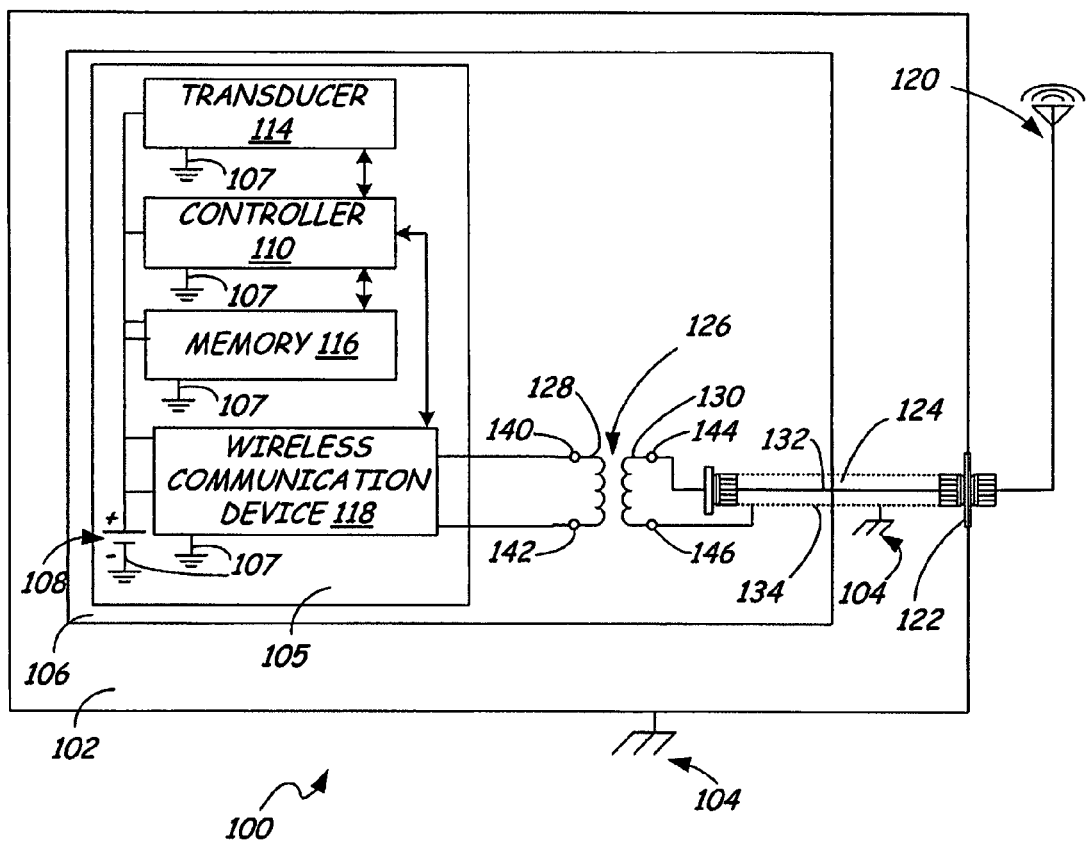
FIG. 3 is a block diagram of a representative field device of the type shown in FIG. 2 having an electrical circuit including wireless communication circuitry for communication with a remote device that is isolated from a housing of the field device according to one illustrative embodiment.

Referring to FIG. 3, a block diagram of a field device 100 according to one embodiment of the invention is shown. Field device 100 includes a housing 102 that is electrically grounded as represented by symbol 104. A circuit board 106 is located within the housing 102. An electrical circuit 105 is located on circuit board 106. Electrical circuit 105 includes a power source 108 that has a high reference (identified with a "+" in FIG. 1) and a low reference (identified with a "−") that is electrically isolated from the housing 102 (as represented by symbol 107). Power source 108 can be any acceptable power source, such as one of the sources discussed above. Power source 108 is illustratively shown as providing power to a controller 110, a transducer 114, memory 116, and a wireless communication device 118. Each of the transducer 114, memory 116, and wireless communication device 118 are in communication with the controller 110 and are also electrically isolated from the housing 102 as represented by the ground symbols 107.

The transducer 114 and the wireless communication device 118, in one illustrative embodiment, are the same or similar devices as the transducer 26 and the wireless communication device 28 described above. Controller 110 accesses memory 116 to access and store data, receive instructions to execute and to perform other similar types of activities. Memory 116 is depicted in FIG. 3 as being physically separate from controller 110. However, memory 116 may be physically integrated with controller 110. Memory 116 can be any suitable type of memory including volatile memory (such as Random Access Memory), non-volatile memory (such as flash memory, EEPROM memory, etc.) or any combination thereof.

As discussed above, memory 116 may contain program instructions for controller 110 as well as any suitable administrative overhead data for field device 100. For example, memory 116 may contain a unique identifier for field device 100, so that field device 100 can distinguish messages sent via wireless communication meant for it among other messages sent via wireless communication. Exemplary identifiers include a Media Access Controller (MAC) address, Electronic Serial Number, global phone number, and an Internet Protocol (IP) address. Moreover, memory 116 may include information about other field devices, such as their unique identifiers, configurations, and abilities.

The controller 110 is in communication with a wireless communication device 118, which illustratively the same or similar to the wireless communication device 28 discussed above for communication with remote devices. The wireless communication device 118 is illustratively operably coupled to an antenna 120, which facilitates the sending and receiving of wireless communication signals to and from other devices. The nature of the operable coupling will be discussed in more detail below. The antenna 120 is attached to the housing 102 through a connector 122. Connector 122, in one illustrative embodiment, has a first conductor (not shown) in communication with antenna 120 when the antenna 120 is attached to the connector 122 and a second conductor that is electrically grounded to the housing 102 of field device 100. Connector 122 is, in one embodiment, a panel mount connector mounted to the housing 102 and capable of mating with a BNC style connector on either side of the housing. Alternatively, other connectors may be used.

Circuit board 106 also preferably includes an isolation transformer 126. Isolation transformer 126 has first and second windings 128 and 130. The first winding 128 of transformer 126 has a first terminal 140 that is illustratively coupled to the wireless communication device 118 of electrical circuit 105 and a second terminal 142 that is coupled to a low potential side of the power supply 108. The second terminal 142 can be coupled to the low potential side of the power supply through the wireless communication device 118 as shown in FIG. 3 or alternatively externally to the wireless communication device 118. Either way, the first winding 128 is electrically isolated from the housing 102.

The second winding 130 is preferably coupled to an electrical conductor 124. In one embodiment, the electrical conductor 124 is a coaxial cable, although other types of electrical conductors may be used. A first terminal 144 of the second winding 130 is coupled to a main conductor 132 of the electrical conductor 124. A second terminal 146 of the second winding 130 is illustratively coupled to a shield 134 of the electrical conductor 124. Electrical conductor 124 is then attached to the connector 122 so that the second winding 130 of the isolation transformer 126 is coupled to the antenna 120 via the main conductor 132 of electrical conductor 124. The shield 134 is coupled to the housing 102 through the second conductor of the connector 122. Thus, the second terminal 146 of the second winding 130 is grounded to the housing 102 as is shown by symbol 104.

Thus, signals are illustratively passed between the wireless communication device 118 and the antenna 120 through the isolation transformer 126 even as the wireless communication device 118 and the antenna 120 are electrically isolated. In one illustrative embodiment, the turn ratio between the first winding 128 and the second winding 130 is about 1:1. Alternatively, the ratio between the first and second windings 128 and 130 can be any other ratio to allow for the use of antennas with various impedances.

It should be appreciated that although FIG. 3 shows the second terminal 146 of the second winding 130 coupled directly to the shield 134, that this is show for schematic purposes only. The circuit board 106 can include a connector such as a sub miniature series A (SMA) connector (not shown) to which the first and second terminals 144 and 146 of the second winding 130 can be attached on one side and electrical conductor 124 can be attached on the other side. Furthermore, it should be appreciated that although the antenna 120 is illustratively attached directly to connector 122, antenna 120 can be remotely located from the field device 100. For example, it may be desirable to use an antenna that is heavier than what can be easily mounted onto the field device 100. In addition, it may be advantageous to mount a directional antenna remotely to advantageously position the antenna. When it is advantageous to remotely mount the antenna, an electrical connector (not shown) such as a coaxial cable can be connected to the antenna and the connector 122 to electrically couple the remotely mounted antenna to the second winding 130.

Figure 4:
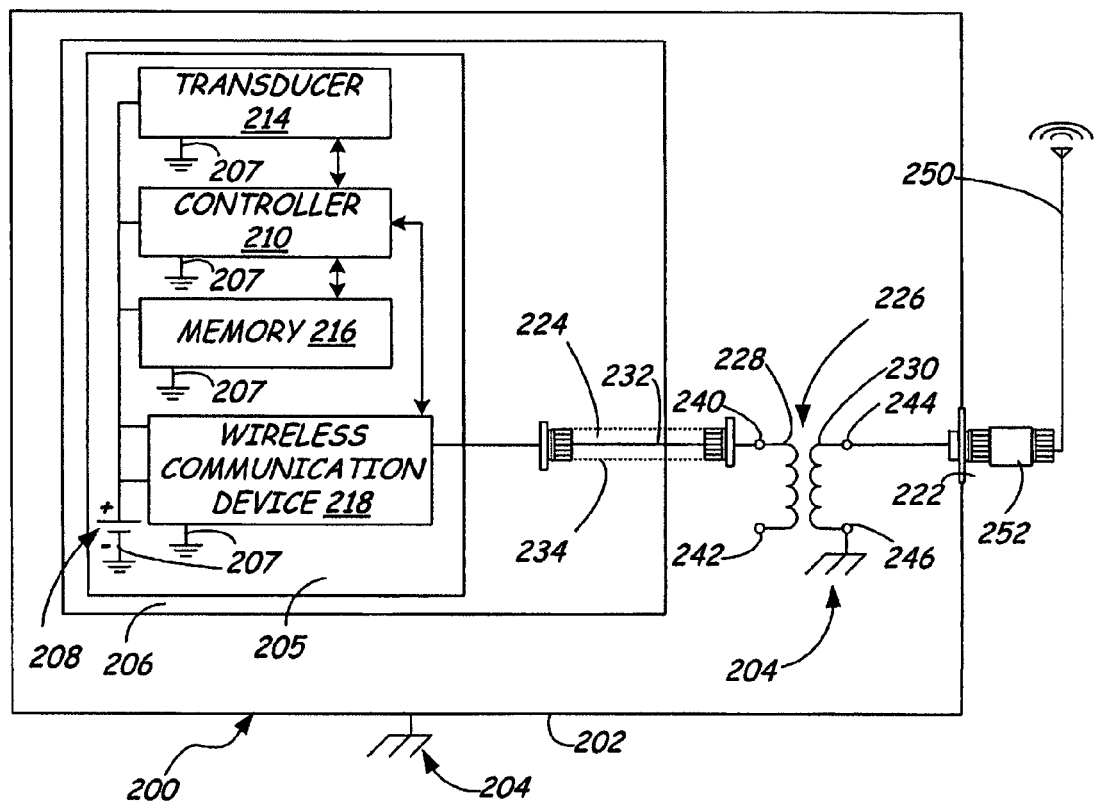
FIG. 4 is a block diagram of a field device of the type shown in FIG. 2 having an electrical circuit including wireless communication circuitry that is isolated from a housing of the field device according to another illustrative embodiment.

FIG. 4 is a schematic diagram illustrating a field device 200 according to another embodiment. Field device 200 includes a housing 202 in which a circuit board 206 is located. An electrical circuit 205 is located on circuit board 206. Electrical circuit 205 includes a controller 210. Electrical circuit 205 also preferably includes a power supply 208 having a high and a low reference (identified as "+" and "−", respectively) that provides power to the controller 210 and is isolated from the housing 202 as is illustrated by symbol 207. Electrical circuit 205 further includes a transducer 214, memory 216, and a wireless communication device 218, all of which receive power from power supply 208, are in communication with controller 210, and are electrically isolated from the housing 202. The operation of these components is similar to those described above in association with field device 100. Wireless communication device 218 is coupled to a coaxial cable 224 or other similar device having electrical conductors suitable for transmitting electrical signals, which in turn is coupled to an isolation transformer 226.

Isolation transformer 226 is illustratively not located on circuit board 206. Isolation transformer 226 includes the first winding 228, which is coupled to wireless device 218 through the cable 224. A first terminal 240 of the first winding 228 is illustratively connected to a first conductor 234 of cable 224. A second terminal 242 of the first winding 228 is illustratively attached to a second conductor 232 of cable 224. The first conductor 234 of the cable 224 is coupled to the wireless device 218. The second conductor 232 is coupled to the low reference of power supply 208, either external to the wireless communication device 218 as shown in FIG. 4 or alternatively, via the wireless communication device 218. In either case, the first winding 228 is isolated from the housing 202. The cable 224, as discussed above with respect to electrical conductor 124, can be a coaxial cable so that the first conductor 234 is a main conductor of the cable 224 and the second conductor 232 is a shield.

Isolation transformer 226 also includes a second winding 230, which is coupled to a connector 222 and is in electrical communication with the housing 202. An antenna 220 is in communication with the second winding 230 via connector 222. The second winding 230 is shown as being attached directly to a ground 204 for schematic purposes. Each of the first and second terminals 244 and 246 can be attached to the connector 222, with one conductor of the connector 222 being in electrical communication with the housing 202.

Field device 200 further includes a lightning arrestor 252 that is positioned between and attached to connector 222 and antenna 250. In one illustrative embodiment, the lightning arrestor is a model LP24RPC lightning arrestor manufactured by Maxrad, which utilizes a gas discharge tube referenced to the ground of the housing 202. Alternatively, any acceptable lightning arrestor device can be used. The field device 100 shown in FIG. 3 does not include a lightning arrestor. Such an arrestor may be added to the field device 100 or removed from field device 200 without departing from the spirit and scope of the embodiments.

While the embodiments discussed above include a wireless communication device integrally mounted onto a circuit board located within a field device, other embodiments have been contemplated. For example, a field device having a two-wire protocol can have a wireless communication device attached thereto, which receives input from the field device and provides wireless communication to other remote devices. Such an add-on device (not shown) can include a wireless communication device with an isolation transformer positioned between the wireless communication device and an antenna that is grounded to the housing of the add-on device.

Figure 5:
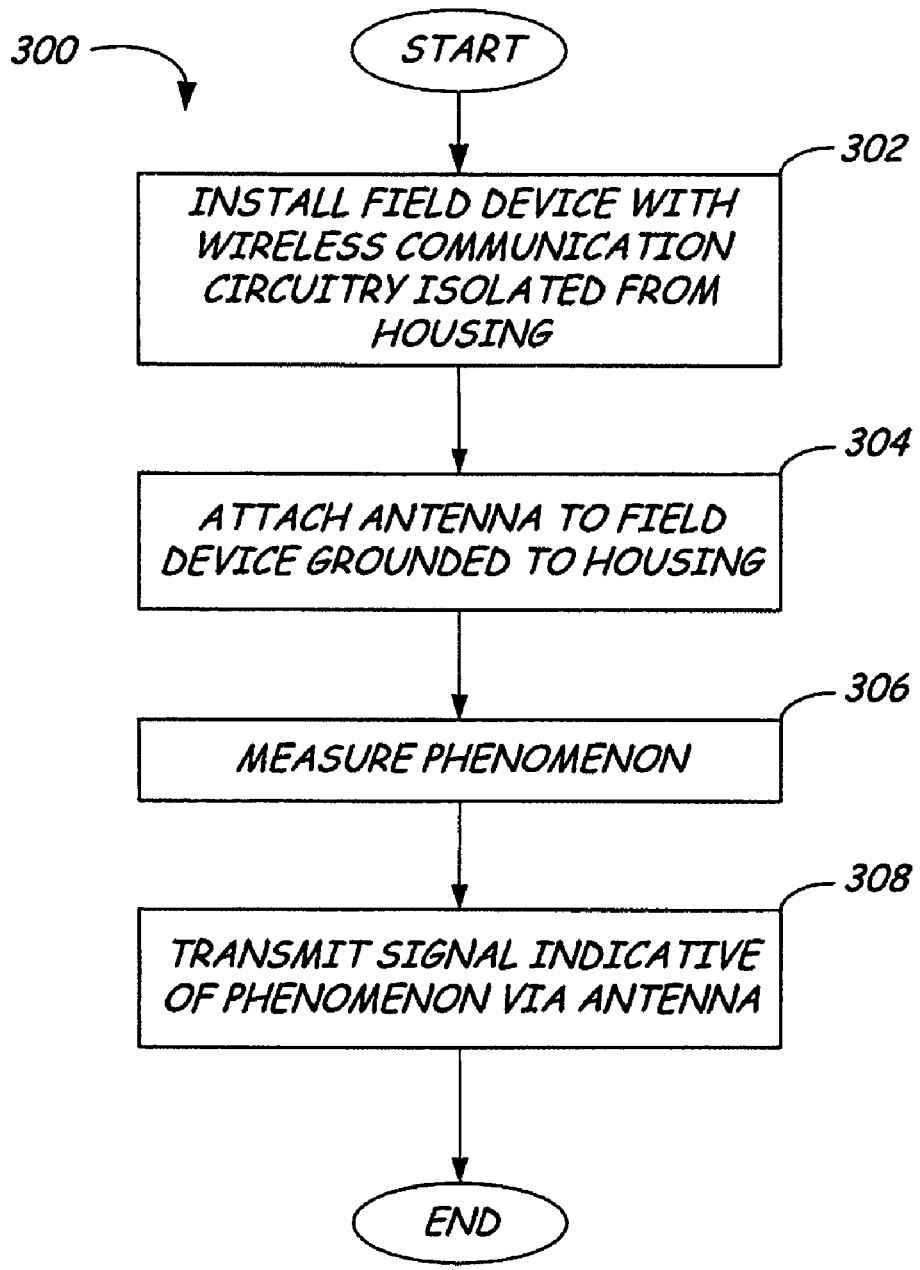
FIG. 5 is a flow diagram detailing a method of communicating from a field device to a remote device according to one illustrative embodiment.

FIG. 5 refers to a method 300 of communicating information from a field device to another device using wireless communication. In block 302, a field device such as field device 100 is installed with wireless communication circuitry isolated from the housing of the field device. An antenna is attached to the field device. The antenna is grounded to the housing. This is represented by block 304. The step of attaching the antenna to the field device can include providing a lightning arrestor that is positioned between a connector located on the field device and the antenna.

Once the field device is installed and capable of communicating with other remote devices, the field device illustratively measures a parameter. This is represented by block 306. The field device then transmits a signal indicative of the parameter via an antenna, which is represented by block 308. The signal that is provided via the antenna can be a radio frequency signal. Alternatively, any number of signals may be employed of the types described above.

The embodiments disclosed above provide several important advantages. For example, field devices, which are intended to make sensitive measurements, have certain measuring circuitry that is isolated from the housing of the field device. Therefore, such sensitive measurements are not impacted by ground loops, which may be present in the ground that is common to the field device housing. Furthermore, any stray radio frequency (RF) fields that may be induced onto the shield of a cable or other similar device positioned between the antenna and the floating circuit can be shunted to the housing without affecting the measurement circuitry. In addition, a standard antenna used to communicate information to and from the field device can be attached to a connector that is grounded to the case as opposed to being isolated from the housing. Further, lightning arrestors of the type described above can be employed and can be grounded to the housing, thereby improving their effectiveness.

Although the present discussion has been focused on illustrative embodiments, workers skilled in the art will recognize that changes may be made in form and detail without departing from the spirit and scope of the discussion.

What is claimed is:

1. A field device in an industrial process control system, comprising:
   an electrically grounded housing;
   a transducer configured to control or sense a process variable of a process fluid of the industrial process;
   an electrical circuit coupled to the transducer and having a plurality of electrical components including wireless communication circuitry located within the housing, the electrical circuitry has an internal ground;
   an antenna attached to the housing;
   an electrical conductor having a shield positioned between the wireless communication circuitry and the antenna; and
   wherein the electrical conductor is configured to transmit electrical signals between the electrical circuit and the antenna, wherein the electrical circuit internal ground is electrically isolated from the grounded housing, and wherein the shield is electrically grounded to the housing.

2. The field device of claim 1 and further comprising:
   a transformer having a first winding coupled to the electrical circuit and a second winding having a first terminal in electrical communication with the antenna.

3. The field device of claim 2 and further comprising:
   a printed circuit board located within the housing, wherein at least one of the plurality of the components of the electrical circuit and the transformer are located thereon.

4. The field device of claim 2, wherein the housing includes a connector that is electrically grounded to the housing and wherein a second terminal of the second winding is grounded to the housing through the connector.

5. The field device of claim 4, wherein the electrical conductor is attached to the second winding on a first end and the connector on a second end and wherein the shield is grounded to the housing.

6. The field device of claim 4, wherein the transformer is positioned adjacent and attached to the connector.

7. The field device of claim 2, wherein the transformer has a turn ratio between the first and second windings other than about 1:1.

8. The field device of claim 1 and further comprising:
   a lightning arrestor positioned between the antenna and the electrical circuit.

9. The field device of claim 8, wherein the lightning arrestor is electrically grounded to the housing.

10. The field device of claim 1, wherein the field device is a process variable transmitter.

11. A field device in an industrial process control system, comprising:
    an electrically grounded housing having a housing ground;
    a transducer exposed to a process fluid of the industrial process and configured to sense or control a process variable of the process fluid;
    an electrical circuit coupled to the transducer and disposed within the housing, the electrical circuit configured to produce a signal indicative of a sensed process parameter or variable, the electrical circuit having an internal ground;
    a wireless communication device electrically coupled to the electrical circuit and the internal ground;
    an antenna attached to the housing; and a transformer having a first winding coupled to the wireless communication device and a second winding coupled to the antenna configured to isolate the internal ground from the housing ground.

12. The field device of claim 11 and further comprising:
a lightning arrestor positioned between the antenna and the wireless communication device.

13. The field device of claim 11 and further comprising:
a printed circuit board located within the housing, wherein the wireless communication device and the transformer are attached to the printed circuit board.

14. The field device of claim 11 and further comprising:
an electrical conductor having a shield, wherein the shield is attached to the second winding on a first end and wherein the shield is grounded to the housing ground.

15. The field device of claim 11, wherein the wireless communication device includes a radio frequency transmitter.

16. A method of communicating for a field device in an industrial process control system, comprising:
providing a transducer for sensing or controlling a process variable of a process fluid of the industrial process;
providing a wireless communication device coupled to the transducer and located within and having an internal ground electrically isolated from a ground of a housing for sending and receiving information to and from remote devices;
attaching an antenna to the housing;
positioning a transformer between the wireless communication device and the antenna and isolating the internal ground from the housing ground; and
transmitting a signal between the wireless communication device and the antenna via the transformer.

17. The method of claim 16, wherein the step of transmitting a signal includes transmitting a radio frequency signal.

18. The method of claim 16, and further comprising the step of attaching an electrical conductor having a shield between the transformer and the antenna so that the shield is grounded to the housing.

19. The method of claim 16 and further comprising:
attaching a lightning arrestor between the antenna and the wireless communication device, wherein the lightning arrestor is electrically grounded to the housing.

* * * * *